Figure 1:
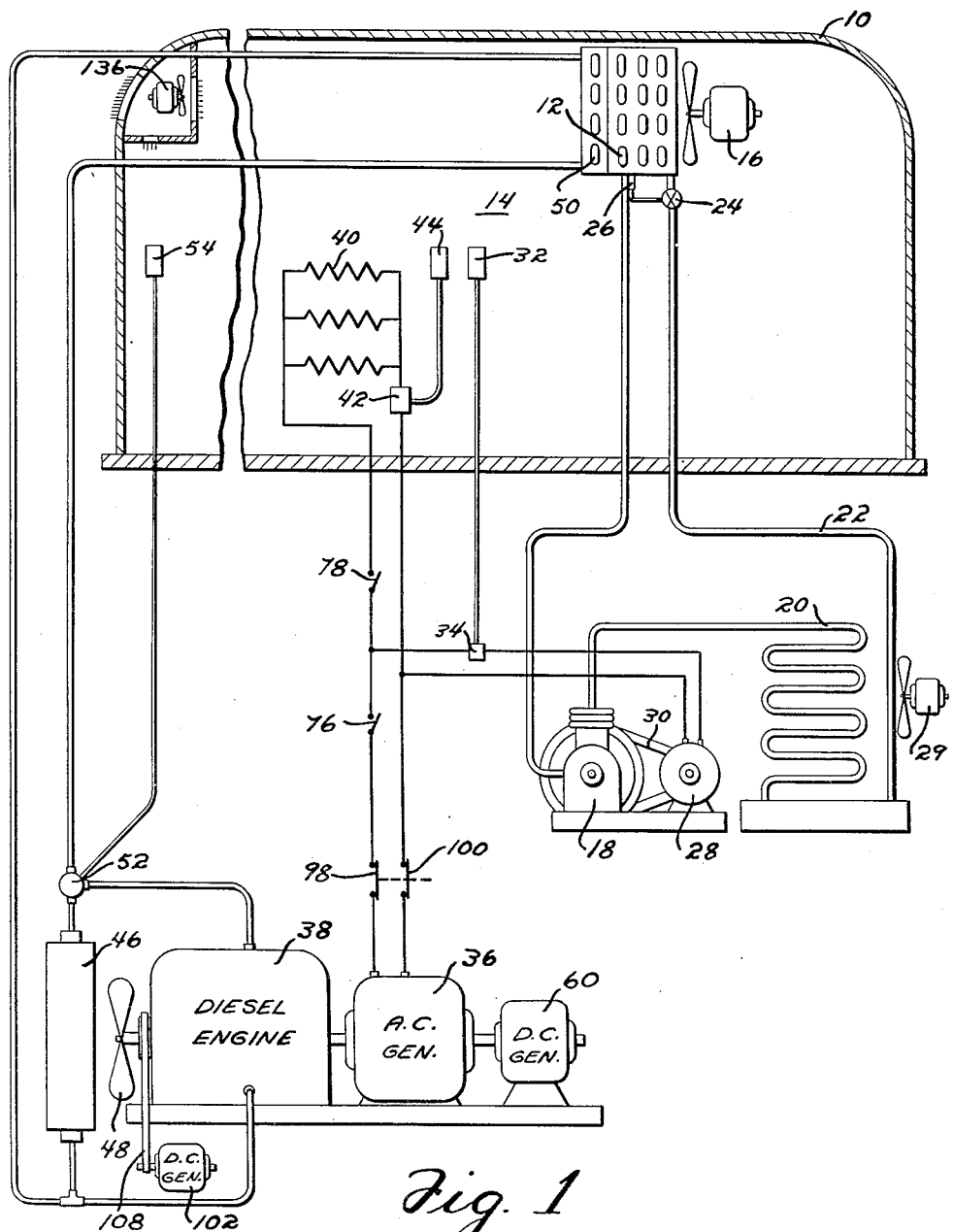

Donald F. Alexander, INVENTOR.
BY Spencer, Hardman & Fehr.
His Attorneys.

Donald F Alexander, INVENTOR.

Patented Jan. 2, 1951

2,536,248

UNITED STATES PATENT OFFICE 2,536,248

GENERATOR REGULATION

Donald F. Alexander, Oakwood, Ohio, assignor to General Motors Corporation, Dayton, Ohio, a corporation of Delaware Application September 13, 1945, Serial No. 616,078

17 Claims. (Cl. 257—3)

This invention relates to an improved electrical system for use on a railway car or the like.

One object of this invention is to provide an improved railway air conditioning system in which a Diesel engine or the like supplies all of the necessary electrical energy for lighting the car and for energizing the air conditioning and ventilating apparatus.

Another object of this invention is to provide a system in which the compressor motor may be started and stopped without causing the car lights to flicker.

Another object is to provide one electrical circuit for the electric lights which require a constant impressed voltage and another electrical circuit for the electric motors and the heating elements which do not require a constant voltage.

Another object of this invention is to provide an improved arrangement for controlling the field of the generator which supplies electrical energy to the various motors and the electric heating elements.

Still another object of this invention is to provide means for forcing the field of the generator when starting the compressor motor.

Further objects and advantages of the present invention will be apparent from the following description, reference being had to the accompanying drawings, wherein a preferred form of the present invention is clearly shown.

Figure 2:
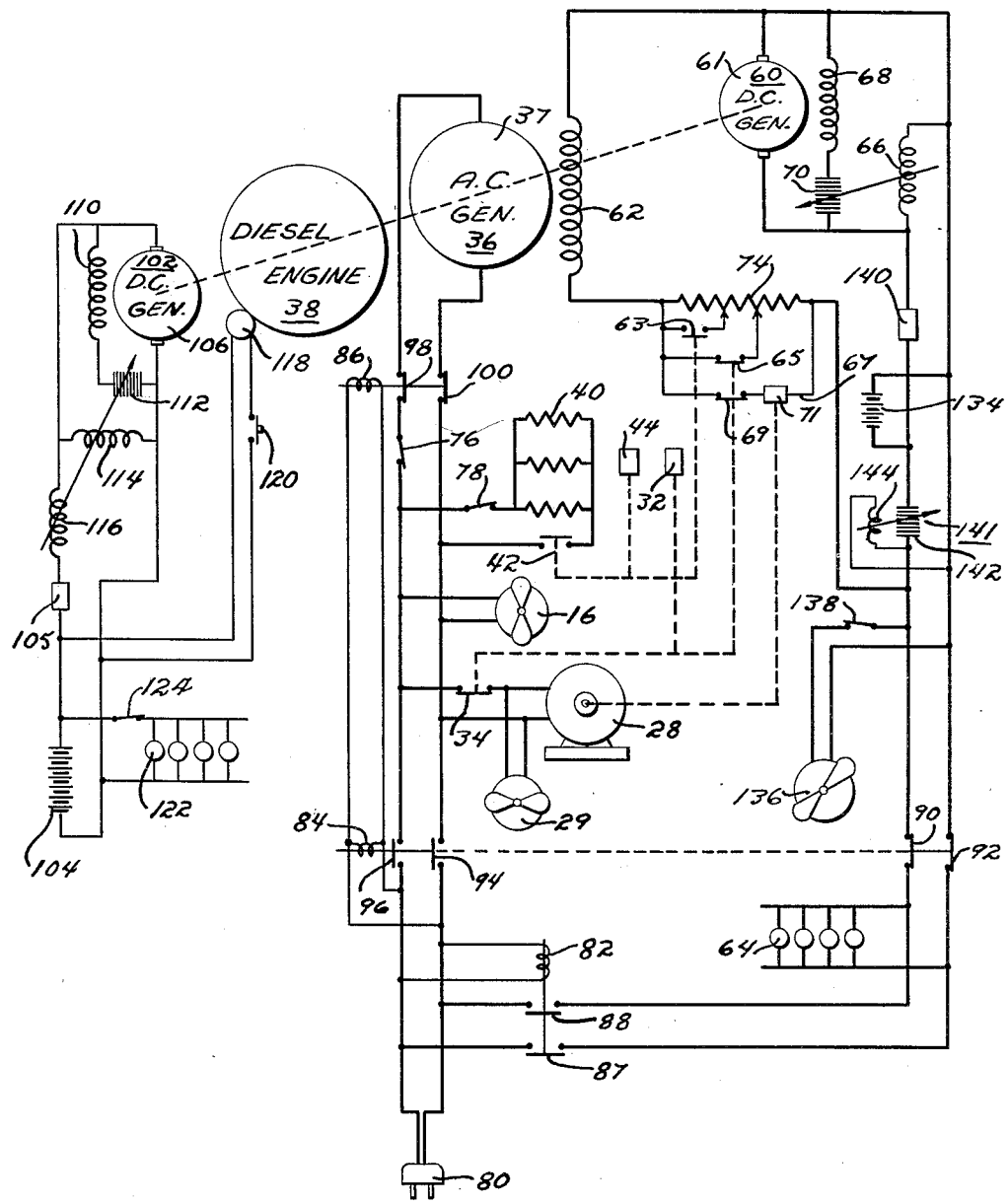

In the drawings:

Fig. 1 is a diagrammatic view showing the relationship between the main power unit and the car air conditioning apparatus; and Fig. 2 shows the wiring diagram for the apparatus shown in Fig. 1.

In designing systems for supplying the necessary electrical energy for operating the car lighting system, the control circuits, etc. and for supplying power for either heating or cooling the car air, it has usually been considered necessary to provide a large heavy duty battery for energizing the lights and the compressor motor. In order to eliminate the use of heavy duty batteries, it has been proposed to provide a large generator for supplying power for energizing the lighting circuits and also the car air conditioning apparatus, but this arrangement has not been fully satisfactory. In the former type of system, expensive heavy weight storage batteries have been required, in addition to a large number of expensive regulators, relays and the like which have not proven fully satisfactory under all operating conditions. In those systems in which a large sized generator has been provided for directly energizing both the lighting circuits and the air conditioning equipment, special voltage regulators and the like have been required and even then excessive light flicker has resulted whenever the air conditioning apparatus has been cut in or out of the circuit. In designing the system described hereinafter, all of these problems have been solved and at the same time the system has been simplified, and rendered more reliable in operation.

Referring now to the combination disclosed in Fig. 1, the reference numeral 10 designates a railway vehicle or the like, which is provided with a system embodying my invention. The air for the vehicle 10 is adapted to be conditioned by means of a conventional refrigerating system which comprises an evaporator 12, mounted directly within the conditioned space 14. Air is circulated over the evaporator 12 by means of a fan unit 16. The refrigerant vaporized in the evaporator 12 is compressed by the compressor 18 which discharges the compressed refrigerant into the usual form of condenser 20 wherein the refrigerant is condensed before returning to the evaporator through the line 22. The flow of refrigerant from the condenser 20 to the evaporator 12 may be controlled by the usual form of thermostatic valve 24, or any other suitable control means such as a fixed restrictor. In order to prevent liquid refrigerant from returning to the compressor, a thermostatic bulb 26 is provided for closing the expansion valve 24 when the liquid refrigerant reaches the outlet of the evaporator. Inasmuch as these details of the refrigerant system are all conventional, no further description of the refrigerating system need be given.

The compressor 18 is driven by means of an alternating current motor 28 which drives the compressor through the belt 30. The compressor motor 28 is started and stopped in response to temperature changes within the car. The thermostat 32, located in the conditioned space, is arranged to interrupt the circuit to the motor 28 by means of the switch 34. The electrical energy for operating the electrical motor 28 is supplied by the alternating current generator 36 which is driven by a constant speed Diesel engine 38. As shown in Fig. 2, the alternating current generator 36 comprises an armature 37 and a field coil 62. In addition to supplying electrical energy for energizing the motor 28, the alternator 36 is also adapted to supply electrical energy to the heaters 40 which are used for heating the car whenever heating is required. The flow of current through the heaters 40, is controlled by switch unit 42 which, in turn, is under control of the thermostat 44 located directly within the compartment to be heated. The Diesel engine 38 is adapted to run continuously and is preferably of the type which has very close speed control so that sudden changes in load on the engine do not cause fluctuations in the speed of the engine.

The Diesel engine 38 is of the water cooled type and includes the usual form of radiator 46 for dissipating the heat generated by the Diesel engine. A fan 48 is adapted to circulate air over the radiator 46 in the usual manner. Inasmuch as there are times during the cooling season when it is desirable to reheat the air flowing over the evaporator 12, a separate reheating coil 50 is provided which may be supplied with a heating medium from the Diesel engine. The arrangement is such that waste heat from the Diesel engine may be dissipated through the reheat coil 50 in place of the usual engine radiator 46. During the heating season, the waste heat serves to heat the air flowing over coil 50. The three way valve 52 may be used for controlling the amount of heating fluid diverted from the engine radiator 46 to the coil 50. As shown in Fig. 1, the valve 52 is controlled by a thermostat 54 located within the compartment to be conditioned. The valve 52 may be the "on and off" type or may be a modulating type of valve.

As shown in Figs. 1 and 2, the Diesel engine 38 also drives an oversized exciter 60 which serves to generate direct current for exciting the field coil 62 of the alternator 36. The direct current generator 60 also generates current for energizing the main car lights 64. As shown in Fig. 2, the generator 60 comprises an armature 61 and a field coil 68. The output of the direct current generator 60 is controlled by the voltage coil 66 which regulates the flow of current through the field coil 68 by means of the carbon pile rheostat 70. The flow of current through the field coil 62 of the main alternator 36 is controlled in such a manner as to maintain the correct field excitation on the alternator for the particular load on the alternator at any given time. Thus a first switch 63 is provided as shown for short circuiting a portion of the external field resistance 74 whenever the heating elements 40 are energized. The switch 63 is operated simultaneously with the heater switch 42 so as to make suitable adjustments in the field resistance 74 simultaneously with turning on or off the electric heating elements 40. Likewise, a switch 65 has been provided for making a suitable adjustment in the field resistance 74 so as to adjust the field resistance each time the compressor motor is turned on or off. The switch 65 is operated simultaneously with the switch 34 by means of any suitable interlocking means or common actuating mechanism with the result that an adjustment is made in the field resistance 74 each time the compressor motor 28 is started or stopped.

When the compressor motor 28 is first energized, an initial surge of current will flow through the motor windings thereby placing an extra load on the alternator 36 until the motor approaches full speed. Such an initial surge of current would normally reduce the output voltage of the generator armature 37 with a serious loss in starting torque of the compressor motor energized from armature 37. In order to compensate for this surge of current through the compressor motor 28 and for the corresponding surge of current through the generator armature 37 during the initial starting of the compressor motor, a field forcing arrangement has been provided which comprises a circuit 67 which is used for shunting the field resistance 74 when the compressor motor is first energized. The circuit 67 includes a switch 69 which is arranged to be closed simultaneously with the compressor motor control switch 34 so as to close the shunt circuit 67 when the switch 34 closes. The shunt circuit 67 also includes a switch 71 which is operated in response to the speed of the compressor motor 28. The switch 71 may be a centrifugal switch or any other suitable type of switch which is designed to open the circuit through the shunt circuit 67 as the compressor motor 28 approaches full speed and the need for field forcing is eliminated.

As shown in Fig. 2, the alternating current generator 36 supplies current to the electric heaters 40, the evaporator fan motor 16, the compressor motor 28 and the condenser fan motor 29. Manual switches 76 and 78 are provided for manually controlling the flow of current to the air conditioning apparatus and the electrical heaters 40.

In order to provide for emergency operation of the air conditioning apparatus in certain railway terminals where regulations prevent Diesel operation, means have been provided for energizing the air conditioning apparatus and the car lighting system from an outside source of alternating current. This means comprises a connector 80 which may be plugged into any suitable source of alternating current such as usually provided at all large terminals. Upon supplying current to the system through the plug 80, solenoids 82, 84 and 86 become energized. Energization of the solenoid 82 causes closing of the switches 87 and 88 thereby placing the car lighting system 64 in circuit with the outside source of electrical energy. While no transformer or rectifier has been shown between the source of outside current and the lights 64, it is obvious that either a transformer or a rectifier may be used if desired. The lights 64 may be of the type which can be used on either alternating current or direct current in which case no rectifier would be necessary. Energization of the solenoid 84 opens the switches 90 and 92 thereby disconnecting the car lights 64 from the direct current generator 60. Energization of the relay 84 also closes the switches 94 and 96 whereby the air conditioning apparatus is placed in circuit with the outside source of electrical energy. Energization of the solenoid 86 opens the switches 98 and 100 whereby the main alternating current generator 36 is disconnected from the electrical circuits of the air conditioning apparatus. By virtue of this arrangement, it is impossible to supply electrical energy to the air conditioning apparatus and the car lights 64 from both sources of electricity at the same time.

In order to provide a convenient means for starting the Diesel engine, a separate direct current generator 102 is provided for charging a small storage battery 104. The direct current generator 102 is driven by the Diesel engine 38 by means of belt 108 and comprises an armature 106 and a field coil 110. The flow of current through the field coil 110 is controlled by the carbon pile rheostat 112. The rheostat 112 is in turn under the combined control of the voltage coil 114 and the current coil 116. This type of control being well known in the art needs no further description. A conventional reverse current relay 105 is placed in circuit between the battery and the generator to disconnect the battery from the generator whenever the generator stops. The battery 104 is normally used only for energizing the Diesel engine starting motor 118 and may therefore be of light weight construction. Energization of the starting motor 118 is controlled by the usual push button 120 in circuit with the starter motor 118.

Inasmuch as there may be times when it is desirable to provide car lighting when neither the Diesel engine nor any outside source of current is available for use, emergency lights 122 have been provided which may be energized from the battery 104 by closing the manual switch 124.

The motor 16 depends upon operation of the main alternator 36 for its energization and therefore does not operate when the Diesel engine stops. Since it is desirable to provide some means for ventilating the car at such times as when the Diesel engine is not in operation, a ventilating fan unit 136 has been provided which may be energized from the storage battery 134. A manual switch 138 may be used for manually starting and stopping the ventilating unit 136. For purposes of illustration, the ventilating unit 136 has been shown as comprising a simple electric fan which may be used for circulating either fresh air, recirculated air, or a mixture of both within the conditioned space when the Diesel engine is not in operation.

By virtue of the above described electrical system, it is apparent that the main car lighting system is energized from the constant speed generator 60 and that no other heavy duty electrical equipment is energized from this generator. With such an arrangement the voltage supplied to the lighting system remains substantially constant. This is important since lighting systems require a very constant voltage for proper operation. It is also apparent that the heavy duty electrical equipment energized from the alternating current generator 36 is all of such a nature that minor fluctuations in the voltage supplied from the generator 36 will have very little effect on the operation of the apparatus. As a consequence thereof, no complicated regulating means need be provided for closely regulating the output of the generator 36. This materially reduces the cost of the original equipment and also saves on the upkeep cost.

A battery 134 has been provided which may be used to supply electrical energy to the main car lighting system at such times when the Diesel engine 38 is not in operation. A conventional reverse current relay 140 has been provided between the battery and the generator 60 so as to disconnect the battery from the generator when the generator voltage drops below a predetermined value. Inasmuch as reverse current relays are well known in the art, the structural details thereof need not be described.

An automatic voltage regulator generally designated by the reference numeral 141 has been provided for regulating the voltage supplied to the field circuit and the external field control resistor circuits of the alternator 36. The voltage regulator 141 may be of any design and preferably includes a carbon pile type of variable resistance element 142 and a voltage coil 144 which controls the flow of current through the resistance element 142 in accordance with well known practice.

In order to simplify this disclosure, all of the alternating current circuits have been shown as single phase circuits. However, it is within the purview of this invention to utilize polyphase circuits and equipment in lieu of the single phase circuits and equipment shown.

While the form of embodiment of the invention as herein disclosed, constitutes a preferred form, it is to be understood that other forms might be adopted, all coming within the scope of the claims which follow.

What is claimed is as follows:

1. Railway air conditioning apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser, and compressor, an alternating current motor, torque transmitting means between said alternating current motor and said compressor, means for energizing said alternating current motor from said alternating current generator, said alternating current generator comprising a field coil energized by said direct current generator, means including a field resistance and a first switch for controlling said field resistance, means including a second switch for controlling the energization of said alternating current motor, and interconnecting means between said first and second switches for causing said first and second switches to operate substantially in unison.

2. Railway air conditioning apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said alternating current motor and said compressor, means for energizing said alternating current motor from said alternating current generator, said alternating current generator comprising a field coil energized by said direct current generator, a field resistance in series with said field coil, first means responsive to energization of said alternating current motor for short-circuiting at least a portion of said field resistance, said last named means including speed responsive means for rendering said short-circuiting means ineffective when said alternating current motor attains substantially normal operating speed.

3. Railway air conditioning apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said motor and said compressor, means for energizing said motor from said alternating current generator, said alternating current generator comprising a field coil energized by said direct current generator, a field resistance in series with said field coil, first means responsive to energization of said alternating current motor for short-circuiting at least a portion of said field resistance, said last named means including speed responsive means for rendering said short-circuiting means ineffective when said alternating current motor attains substantially normal operating speed, and second means operated in response to energization of said compressor motor for controlling said field resistance independently of said first means.

4. Railway air conditioning apparatus comprising in combination, a power source, an alternating current generator, a direct current generator, torque transmitting means between said alternating current generator and said power source, torque transmitting means between said direct current generator and said power source, an evaporator, means for circulating air to be conditioned in thermal exchange with said evaporator, a condenser, a compressor, refrigerant flow connections between said evaporator, condenser and compressor, an alternating current motor, torque transmitting means between said motor and said compressor, means for energizing said motor from said alternating current generator, said alternating current generator comprising a field coil energized by said direct current generator, a field resistance in series with said field coil, first means responsive to energization of said alternating current motor for short-circuiting at least a portion of said field resistance, said last named means including speed responsive means for rendering said short-circuiting means ineffective when said alternating current motor attains substantially normal operating speed, second means operated in response to energization of said compressor motor for controlling said field resistance independently of said first means, and means for energizing said motor from an outside source of electrical energy when said alternating current generator is inoperable.

5. Air conditioning apparatus comprising in combination, a power source, a main generator including a field circuit and an armature circuit, an auxiliary generator including a field circuit and an armature circuit, a first electric power consuming means for conditioning air for an enclosure, a second electric power consuming means for conditioning air for said enclosure, means for supplying current from said auxiliary generator to said main generator field circuit, means for supplying current from said main generator to said first and second power consuming means, said field circuit of said main generator including a resistance unit, first means for shorting a portion of said resistance unit, second means for shorting a different portion of said resistance unit, a first switch means for controlling the current supply to said first power consuming means, a first single control means for directly operating said first shorting means and said first switch means to directly change the resistance of said resistance unit upon the operation of said first switch means, a second switch means for controlling the current supply to the second power consuming means, and a second single control means for directly operating said second shorting means and said second switch means to directly change the resistance of said resistance unit upon the operation of said second switch means.

6. Air conditioning apparatus comprising in combination, a main generator including a field circuit and an armature circuit, an auxiliary generator including a field circuit and an armature circuit, a refrigerating system for supplying conditioned air for an enclosure including a compressor, a motor for operating said compressor, electric heating means for conditioning air for said enclosure, means for supplying current from said auxiliary generator to the field circuit of said main generator, means responsive to the output of said auxiliary generator controlling the flow of current through the field circuit of said auxiliary generator, connecting means for supplying current from said main generator to said compressor motor, means for supplying current from said main generator to said electric heating means, first switch means for controlling the flow of current to said compressor motor, second switch means for controlling the flow of current to said electric heating means, a field resistance unit connected in the field circuit of the main generator, means including a third switch for controlling said resistance unit, and direct physical interlocking means interconnecting said third switch and one of the other switches for operating said third switch substantially in unison with the one of said other switches.

7. Air conditioning apparatus comprising in combination, a main generator including a field circuit and an armature circuit, an auxiliary generator including a field circuit and an armature circuit, a refrigerating system for supplying conditioned air for an enclosure including a compressor, a motor for operating said compressor, means for supplying current from said auxiliary generator to the field circuit of said main generator, means responsive to the output of said auxiliary generator controlling the flow of current through the field circuit of said auxiliary generator, means for supplying current from said main generator to said compressor motor, resistance means connected in the field circuit of the main generator, means responsive to energization of said compressor motor from said main generator for short circuiting said resistance means, and speed responsive means for rendering said last named means at least partially ineffective when said compressor motor approaches normal operating speed.

8. Air conditioning apparatus comprising in combination, a main generator including a field circuit and an armature circuit, an auxiliary generator including a field circuit and an armature circuit, a refrigerating system for supplying conditioned air for an enclosure including a compressor, a motor for operating said compressor, electric heating means for conditioning air for said enclosure, means for supplying current from said auxiliary generator to the field circuit of said main generator, means responsive to the output of said auxiliary generator controlling the flow of current through the field circuit of said auxiliary generator, means for supplying current from said main generator to said compressor motor, means for supplying current from said main generator to said electric heating means, resistance means connected in the field circuit of the main generator, means responsive to energization or deenergization of said compressor motor for varying the resistance of said resistance means, means responsive to energization or deenergization of said electric heating means for varying the resistance of said resistance means, and means responsive to the speed of said compresssor motor for varying said resistance means.

9. An electrical system including a driving means, a generating means driven by said driving means, said generating means including an armature circuit and a field coil and a regulating means for regulating the current through the field coil, an electrical load, a switch means for connecting said electrical load to said armature circuit, a second electrical load having different current consuming characteristics than the first mentioned load, a second switch means for connecting said second load to said armature circuit, said regulating means having different positions corresponding to different loads, a first single control means for directly operating said first mentioned switch means and for directly moving said regulating means to a first position, and a second single control means for directly operating said second switch means and for directly moving said regulating means to a second position.

10. An electrical system including a driving means, a generating means driven by said driving means, said generating means including an armature circuit and a field coil and a regulating means for regulating the current through the field coil, an electric motor, an electrical load connected to said armature circuit, a switch means for connecting the electric motor to the armature circuit, said regulating means having at least three alternate regulating positions providing three different rates of current flow, a single control means for directly operating said switch means and said regulating means both to first and second alternate positions, and a speed responsive means driven by said electric motor for moving said regulating means to its third position.

11. Air conditioning means comprising in combination, a power source, a generating means driven by said power source, said generating means including an armature circuit and a field coil and a regulating means for regulating the current through the field coil, an electric power-consuming means for conditioning air for an enclosure, switch means for connecting said power-consuming means to said armature circuit, and a direct physical interlocking means interconnecting said switch means and said regulating means for changing said regulating means to provide a different rate of current flow through the field coil whenever said switch means is operated, and a speed responsive means operated by said power-consuming means for further changing said regulating means to provide still another rate of current flow through the field coil.

12. Air conditioning apparatus comprising in combination, a main generator including a field circuit and an armature circuit, an auxiliary generator including a field circuit and an armature circuit, a first electric power consuming means for conditioning air for an enclosure, means for supplying current from said auxiliary generator to said main generator field, means responsive to the output of said auxiliary generator controlling the flow of current through the field circuit of said auxiliary generator, a second power consuming means, means for supplying current from said main generator to said first and second power consuming means, said field circuit of the main generator including a resistance unit, means for shorting a portion of said resistance unit, a switch means for controlling the current supply to said first power consuming means while the second power consuming means remains supplied with current from the main generator, and a single control means for directly operating said shorting means and said switch means to directly change the resistance of said resistance unit upon the operation of said switch means.

13. Air conditioning apparatus comprising in combination, a power source, a main generator including a field circuit and an armature circuit, an auxiliary generator including a field circuit and an armature circuit, said generators being driven by said power source, a first electric power consuming means for conditioning air for an enclosure, a second power consuming means, means for supplying current from said auxiliary generator to said main generator field, means responsive to the output of the said auxiliary generator controlling the flow of current through the field circuit of said auxiliary generator, individual connecting means for individually supplying current from said main generator to said first and second power consuming means, a resistance unit forming a part of the field circuit of said main generator, means for shunting a portion of said resistance unit and a direct physical interlocking means interconnecting said shunting means and said connecting means for controlling said shunting means substantially simultaneously with the energization and deenergization of said first and second power consuming means.

14. An electrical system including a driving means, a generating means driven by said driving means, said generating means including an armature circuit and a field coil and a regulating means for changing the exciting current through the field coil during the normal generation of the generating means, an electric motor connected to said armature circuit, and speed responsive means driven by said electric motor for changing said regulating means in response to changes in motor speed during the normal generation of the generating means, a switch means for controlling said electric motor, and a direct physical interlocking means interconnecting said switch means and said regulating means for changing directly in response to the operating of said switch means said regulating means.

15. An electrical system including a driving means, a generating means driven by said driving means, said generating means including an armature circuit and a field coil and a regulating means for changing the exciting current through the field coil, a first electrical load, a second electrical load connected to said armature circuit, a switch means for connecting and disconnecting said first electrical load to said armature circuit while said second load remains connected to the armature circuit, and a single control means for directly operating said switch means and said regulating means during the continuous supply of energy from said armature circuit to said second load.

16. Air conditioning means comprising in combination, a power source, a generating means driven by said power source, said generating means including an armature circuit and a field coil and a regulating means for changing the excitation current through the field coil, an electric power-consuming means for conditioning air for an enclosure, a second electric power consuming means connected to the armature circuit, switch means for connecting and disconnecting said first power-consuming means to said armature circuit while said second power-consuming means remains connected to the armature circuit, and a direct physical interlocking means interconnecting said switch means with said regulating means for changing said regulating means to provide a different rate of current flow through the field coil whenever said switch means is operated during the normal generation of the generating means.

17. An electric system including a driving means, a generating means driven by said driving means, said generating means including an armature circuit and a field coil and a field resistance means, said field resistance means having resistance changing means for changing its effective resistance to change the exciting current through the field coil, a first electrical load, a second electrical load connected to said armature circuit, a switch means for connecting and disconnecting said first electrical load to said armature circuit while said second load remains connected to the armature circuit, and a single control means for directly operating said switch means and said resistance changing means during continuous supply of energy from said armature circuit to said second load.

DONALD F. ALEXANDER.

REFERENCES CITED

The following references are of record in the file of this patent:

UNITED STATES PATENTS

| Number | Name | Date |
|---|---|---|
| 1,401,492 | Replogle | Dec. 27, 1921 |
| 1,415,012 | Bennett | May 9, 1922 |
| 1,782,514 | Seeley | Nov. 25, 1930 |
| 1,836,992 | Schade | Dec. 15, 1931 |
| 2,152,576 | Weeks | Mar. 28, 1939 |
| 2,231,727 | Longwell | Feb. 11, 1941 |
| 2,339,903 | Alexander | Jan. 25, 1944 |